(12) United States Patent
Cho et al.

(10) Patent No.: US 8,289,578 B2
(45) Date of Patent: Oct. 16, 2012

(54) APPARATUS AND METHOD FOR COMPENSATING OUTPUT IMAGE

(75) Inventors: Min-ki Cho, Yongin-si (KR); Heui-keun Choh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 11/655,251

(22) Filed: Jan. 19, 2007

(65) Prior Publication Data

US 2007/0165256 A1 Jul. 19, 2007

(30) Foreign Application Priority Data

Jan. 19, 2006 (KR) ........................ 10-2006-0005957

(51) Int. Cl.
*H04N 1/40* (2006.01)
(52) U.S. Cl. ..................... 358/3.23; 358/3.22
(58) Field of Classification Search .............. 347/19; 358/1.9; 382/162
See application file for complete search history.

(56) References Cited

U.S. PATENT DOCUMENTS

| | | | | |
|---|---|---|---|---|
| 5,594,557 A * | 1/1997 | Rolleston et al. | ............ | 358/518 |
| 5,739,927 A | 4/1998 | Balasubramanian et al. | | |
| 6,459,436 B1 * | 10/2002 | Kumada et al. | ............... | 345/590 |
| 6,995,870 B2 * | 2/2006 | Holub | ............ | 358/1.9 |
| 7,433,078 B2 * | 10/2008 | Kuhn et al. | .................... | 358/1.9 |
| 7,554,694 B2 * | 6/2009 | Itagaki | ............ | 358/1.9 |
| 2003/0001860 A1 * | 1/2003 | Yamazaki et al. | ............ | 345/590 |
| 2003/0048464 A1 * | 3/2003 | Yamada et al. | | |
| 2005/0093923 A1 | 5/2005 | Busch et al. | | |
| 2005/0157921 A1 * | 7/2005 | Herron | ........... | 382/162 |
| 2007/0165256 A1 * | 7/2007 | Cho et al. | ....................... | 358/1.9 |

FOREIGN PATENT DOCUMENTS

| | | |
|---|---|---|
| EP | 0747853 B1 | 10/2001 |
| JP | 09-009089 A | 1/1997 |
| JP | 10-133362 A | 5/1998 |
| JP | 2002-247396 A | 8/2002 |

OTHER PUBLICATIONS

Communication dated Feb. 27, 2012 from the Korean Intellectual Property Office in a counterpart application No. 10-2006-0005957.

* cited by examiner

*Primary Examiner* — Benny Q Tieu
*Assistant Examiner* — Marcellus Augustin
(74) *Attorney, Agent, or Firm* — Sughrue Mion, PLLC (57) ABSTRACT

An apparatus and method for compensating an output image are provided. The apparatus includes an output image estimation module which estimates an output image for an original image using a lookup table (LUT) that maps one color space to another color space, an error detection module which detects an erroneous patch from the estimated output image, and an LUT compensation module which compensates the LUT based on the detected patch.

9 Claims, 12 Drawing Sheets
(8 of 12 Drawing Sheet(s) Filed in Color)

- FIRST PATCH: L*: 50.41, C*: 39.82
- SECOND PATCH: L*: 58.22, C*: 50.32
- THIRD PATCH: L*: 40.63, C*: 46.66

910 920 930

SECOND ESTIMATED OUTPUT IMAGE (570)

ACHROMATIC PATCHES : L* DECREASES
CHROMATIC PATCHES : L* DECREASES, C* INCREASES

SECOND ORIGINAL IMAGE (530)

APPARATUS AND METHOD FOR
COMPENSATING OUTPUT IMAGE

CROSS-REFERENCE TO RELATED APPLICATION

This application claims priority from Korean Patent Application No. 10-2006-0005957 filed on Jan. 19, 2006, in the Korean Intellectual Property Office, the disclosure of which is incorporated herein by reference in its entirety.

BACKGROUND OF THE INVENTION

1. Field of the Invention

The present invention relates to an apparatus and method for compensating an output image and, more particularly, to an apparatus and method for compensating an output image in which an output image estimated for an original image comprising color data having a predetermined lightness-chroma-hue relationship can be properly compensated to maintain the predetermined lightness-chroma-hue relationship.

2. Description of the Related Art

In general, users are likely to examine an output image estimated for an original image that the users wish to output, and decide to output the estimated output image only when colors in the estimated output image are deemed to be the same as those in the original image.

However, the users may not be able to obtain a desired output image when the colors in the estimated output image have a different lightness-chroma-hue relationship from those in the original input image.

Therefore, it is necessary to provide an estimated output image for the original image while maintaining the lightness-chroma-hue relationship among the colors in the original image.

SUMMARY OF THE INVENTION

The present invention provides an apparatus and method for compensating an output image in which an output image estimated for an original image comprising color data having a predetermined lightness-chroma-hue relationship can be properly compensated to maintain the predetermined lightness-chroma-hue relationship.

However, the aspects of the present invention are not restricted to the one set forth herein. The above and other aspects of the present invention will become more apparent to one of ordinary skill in the art to which the present invention pertains by referencing a detailed description of the present invention given below.

According to an aspect of the present invention, there is provided an apparatus for compensating an output image. The apparatus includes an output image estimation module which estimates an output image for an original image using a lookup table (LUT) that maps one color space to another, an error detection module which detects an erroneous patch from the estimated output image, and an LUT compensation module which compensates the LUT based on the detected patch.

According to another aspect of the present invention, there is provided a method of compensating an output image. The method includes (a) estimating an output image for an original image using a lookup table (LUT) that maps one color space to another color space, (b) detecting an erroneous patch from the estimated output image, and (c) compensating the LUT based on the detected patch.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art. Like reference numerals in the drawings denote like elements, and thus their description will be omitted.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 1:
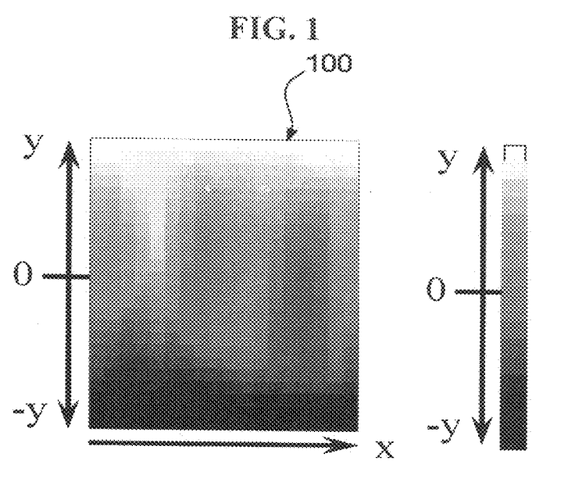
FIG. 1 presents an image 100 that comprises color data defining a lightness-chroma-hue relationship according to an exemplary embodiment of the present invention.

FIG. 1 presents an image 100 that comprises color data defining a lightness-chroma-hue relationship according to an exemplary embodiment of the present invention. Referring to the lightness-chroma-hue relationship illustrated in FIG. 1, the hue angle of the image 100 increases along an x-axis direction, the lightness of the image 100 increases along a y-axis direction, and the chroma of the image 100 changes along the y-axis in such a manner that the closer to the origin on the y-axis, the higher the chroma.

A user can compensate an output image estimated for an image having the lightness-chroma-hue relationship as illustrated in FIG. 1 to have the same the lightness-chroma-hue relationship as the original image by using an apparatus for compensating an output image according to an exemplary embodiment of the present invention.

Figure 2:
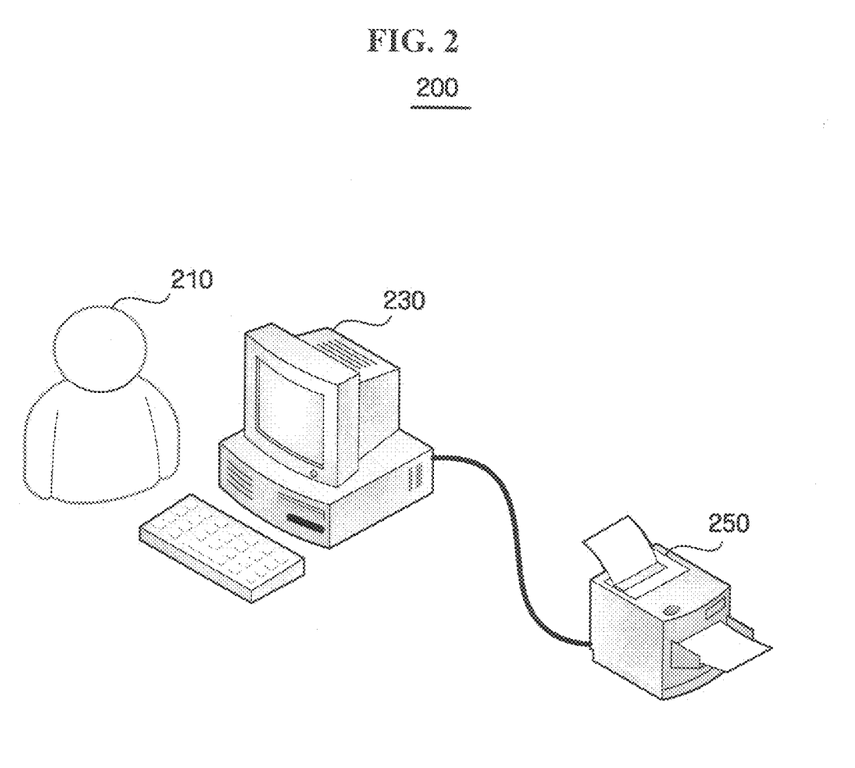
FIG. 2 is a schematic diagram of a system for compensating an output image according to an exemplary embodiment of the present invention.

FIG. 2 is a schematic diagram of a system 200 for compensating an output image according to an exemplary embodiment of the present invention. Referring to FIG. 2, the system 200 includes a host device 230 which compensates an output image according to information input by a user 210, and an output device 250 which outputs the compensated output image provided by the host device 230.

When the user 210 wishes the output device 250 to output an image having a predetermined lightness-chroma-hue relationship, like the image 100 illustrated in FIG. 1, while keeping the predetermined lightness-chroma-hue relationship intact, the host device 230 compensates the original image into an output image maintaining predetermined lightness-chroma-hue relationship using a compensated lookup table (LUT), and transmits the output image to the output device 250.

Referring to the system 200 illustrated in FIG. 2, the host device 230 and the output device 250 are connected via a wired medium. However, the present invention is not restricted to this. In other words, the host device 230 and the output device 250 may be connected via a wireless medium.

Also, the host device 230 and the output device 250 are illustrated in FIG. 2 as being separate. However, the system 200 may be realized by integrating the host device 230 with the output device 250.

For a better understanding of the present invention, assume that a standard color space is a CIEL*a*b* color space, an original image in the host device 230 uses a red-green-blue (RGB) color space, and the output device 250 uses a cyan-magenta-yellow-black (CMYK) color space.

Figure 3:
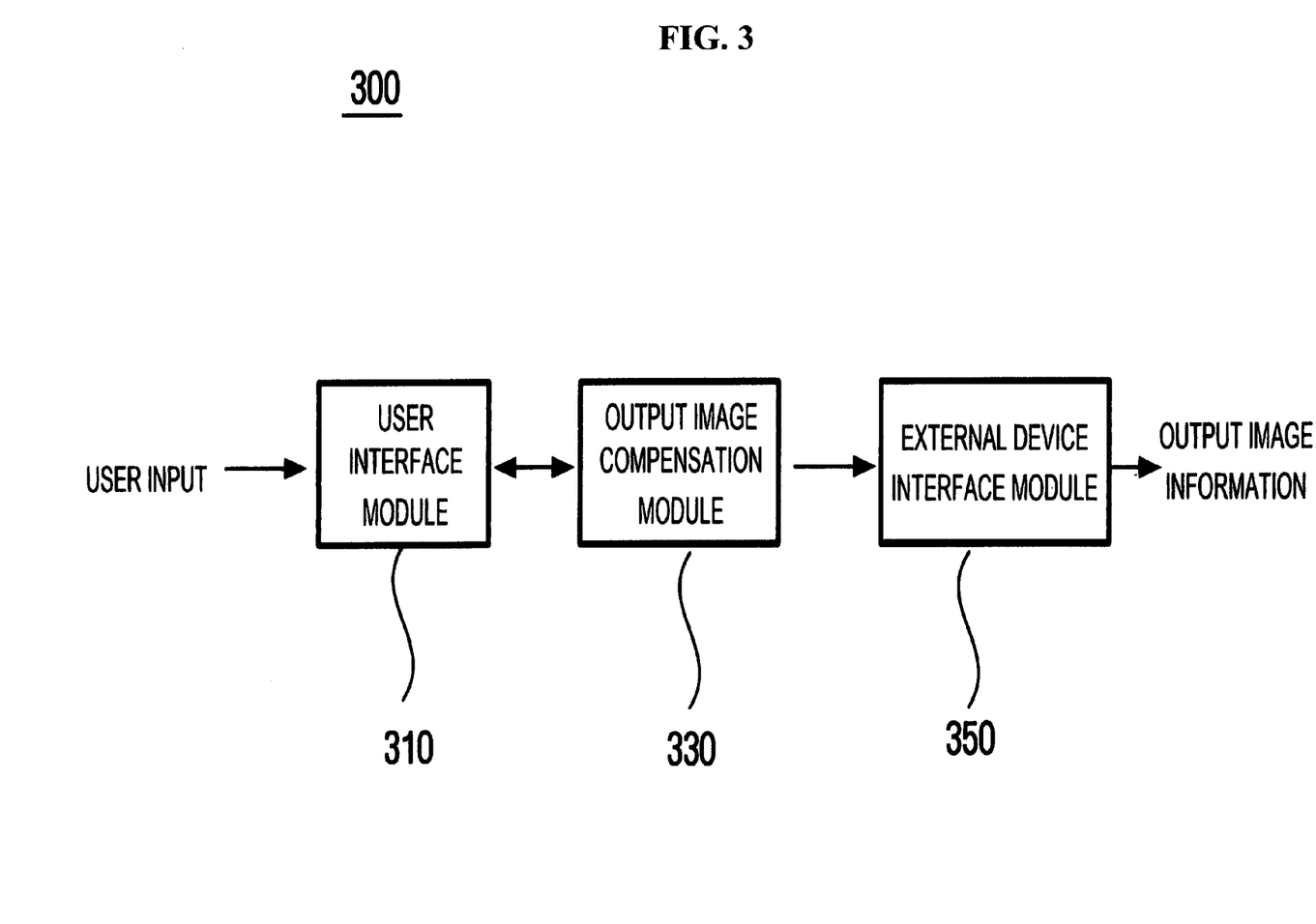
FIG. 3 is a block diagram of an apparatus for compensating an output image according to an exemplary embodiment of the present invention.

FIG. 3 is a block diagram of an apparatus 300 for compensating an output image according to an exemplary embodiment of the present invention. Referring to FIG. 3, the apparatus 300 includes a user interface module 310, an output image compensation module 330, and an external device interface module 350. The apparatus 300 corresponds to the host device 230 illustrated in FIG. 2.

The term 'module', as used herein, means a hardware component which performs certain tasks.

Referring to FIG. 3, the user interface module 310 displays an original image and an estimated output image to a user, and provides the user with a user interface that allows the user to convert the original image into a desired estimated output image. The user interface module 310 receives image information from the user, and transmits the image information to the output image compensation module 330. The output image compensation module 330 compensates a predetermined LUT for estimating an output image according to the image information so that an estimated output image can have the same lightness-chroma-hue relationship as the original image.

Thereafter, the output image compensation module 330 generates a compensated estimated output image using the compensated LUT, and transmits output image information regarding the compensated estimated output image to an external output device via the external device interface module 350 so that the external output device can output the compensated estimated output image.

Figure 4:
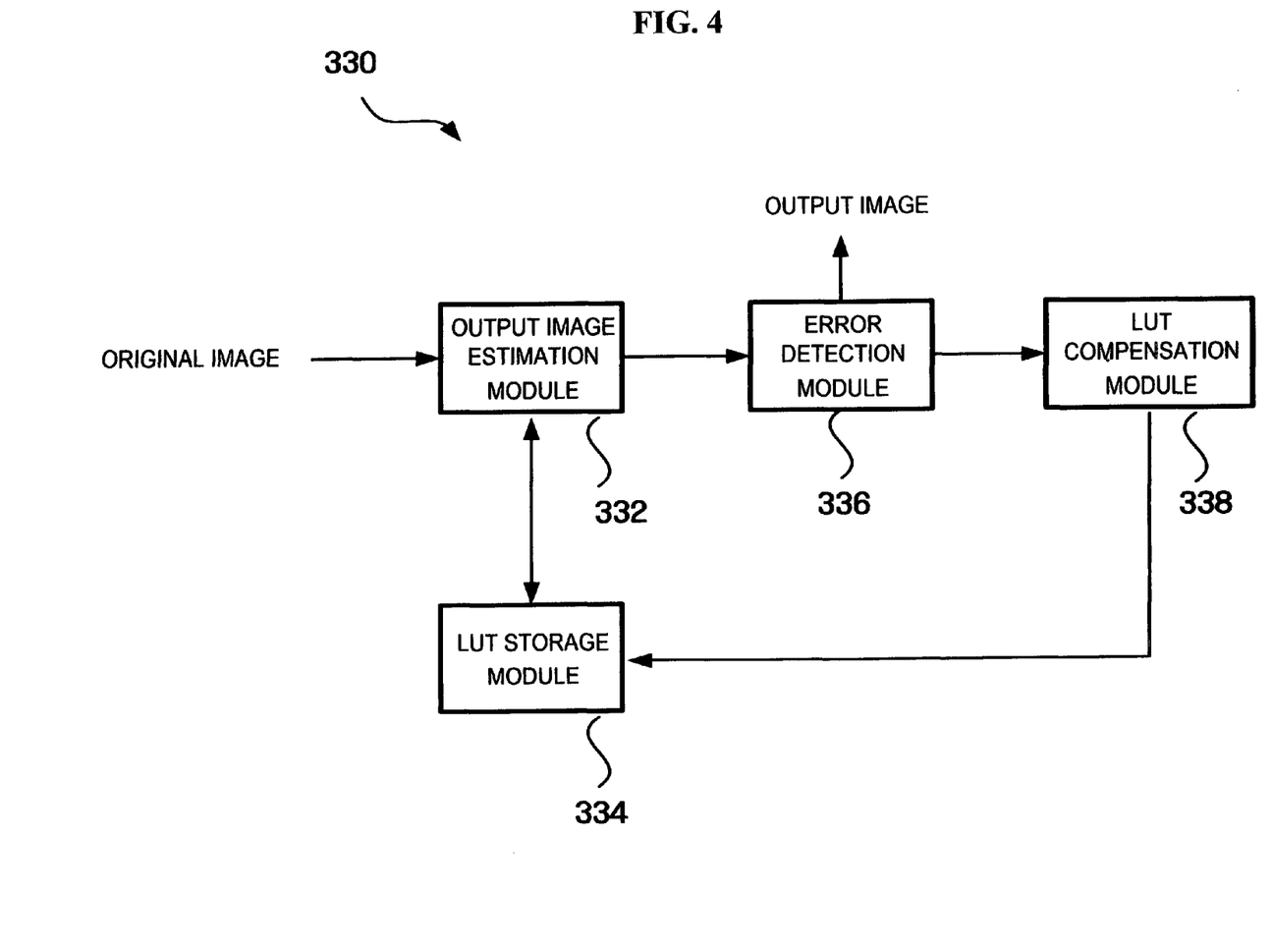
FIG. 4 is a block diagram of an output image compensation module according to an exemplary embodiment of the present invention (illustrated in FIG. 3)

FIG. 4 is a block diagram of an output image compensation module 330 (the output image compensation module 330 illustrated in FIG. 3) according to an exemplary embodiment of the present invention. Referring to FIG. 4, the output image compensation module 330 includes an output image estimation module 332, an LUT storage module 334, an error detection module 336, and an LUT compensation module 338.

The LUT storage module 334 stores a plurality of LUTs for estimating an output image. Examples of the LUTs present in the LUT storage module 334 include an RGB-to-CIEL*a*b* LUT, which is used to convert an RGB image into a CIEL*a*b* image, an RGB-to-CIEL*a*b* LUT, which is used to convert an RGB image into a CIEL*a*b image, a CIEL*a*b*-to-CMYK LUT, which is used to convert a CIEL*a*b* image into a CMYK image, and a CMYK-to-CIEL*a*b* LUT, which is used to convert a CMYK image into a CIEL*a*b* image.

The output image estimation module 332 estimates an output image for an original image using the original image and a predetermined LUT present in the LUT storage module 334. The operation of the output image estimation module 332 will be described later in detail with reference to FIGS. 5, 6, 7, 8A, and 8B.

The error detection module 336 detects an error between the original image and the estimated output image provided by the output image estimation module 332, and compensates the predetermined LUT according to the result of the detection, thereby preventing any error from being generated between the original image and the estimated output image provided by the output image estimation module 332. The operations of the error detection module 336 and the LUT compensation module 338 will be described later in further detail with reference to FIGS. 9 and 10.

The operations of the output image estimation module 332, the error detection module 336, and the LUT compensation module 338 illustrated in FIG. 4 will hereinafter be described in further detail with reference to FIGS. 5 through 10.

The output image estimation module 332 estimates an output image for an original image using a plurality of LUTs present in the LUT storage module 334, and this will hereinafter be described in further detail with reference to FIG. 5.

Figure 5:
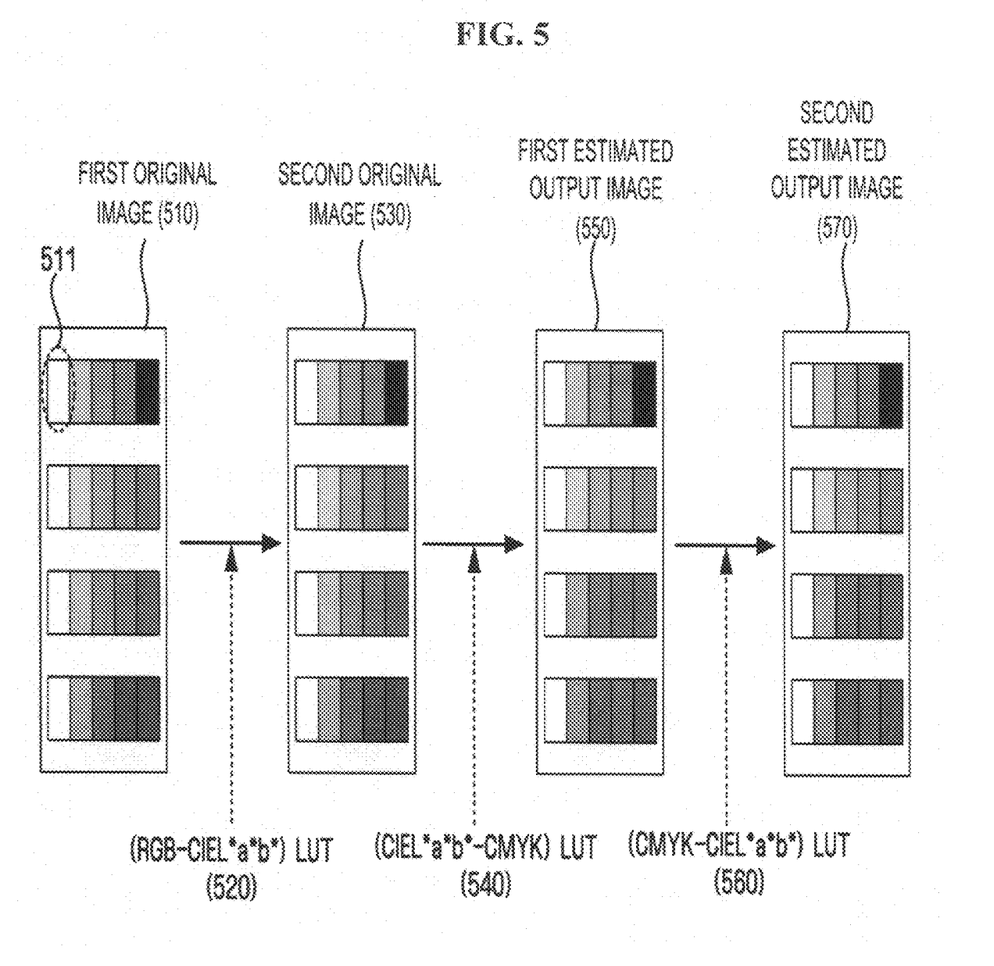
FIG. 5 is a diagram for explaining the operation of the output image compensation module according to an exemplary embodiment of the present invention.

Referring to FIG. 5, the output image estimation module 332 receives a first original image 510. The first original image 510 is comprised of a plurality of patches 511. Here, a patch is a set of a plurality of pixels, and image compensation is performed in units of patches.

The output image estimation module 332 converts the first original image 510 into a second original image 530 using a RGB-to-CIEL*a*b* LUT 520.

Figure 6:
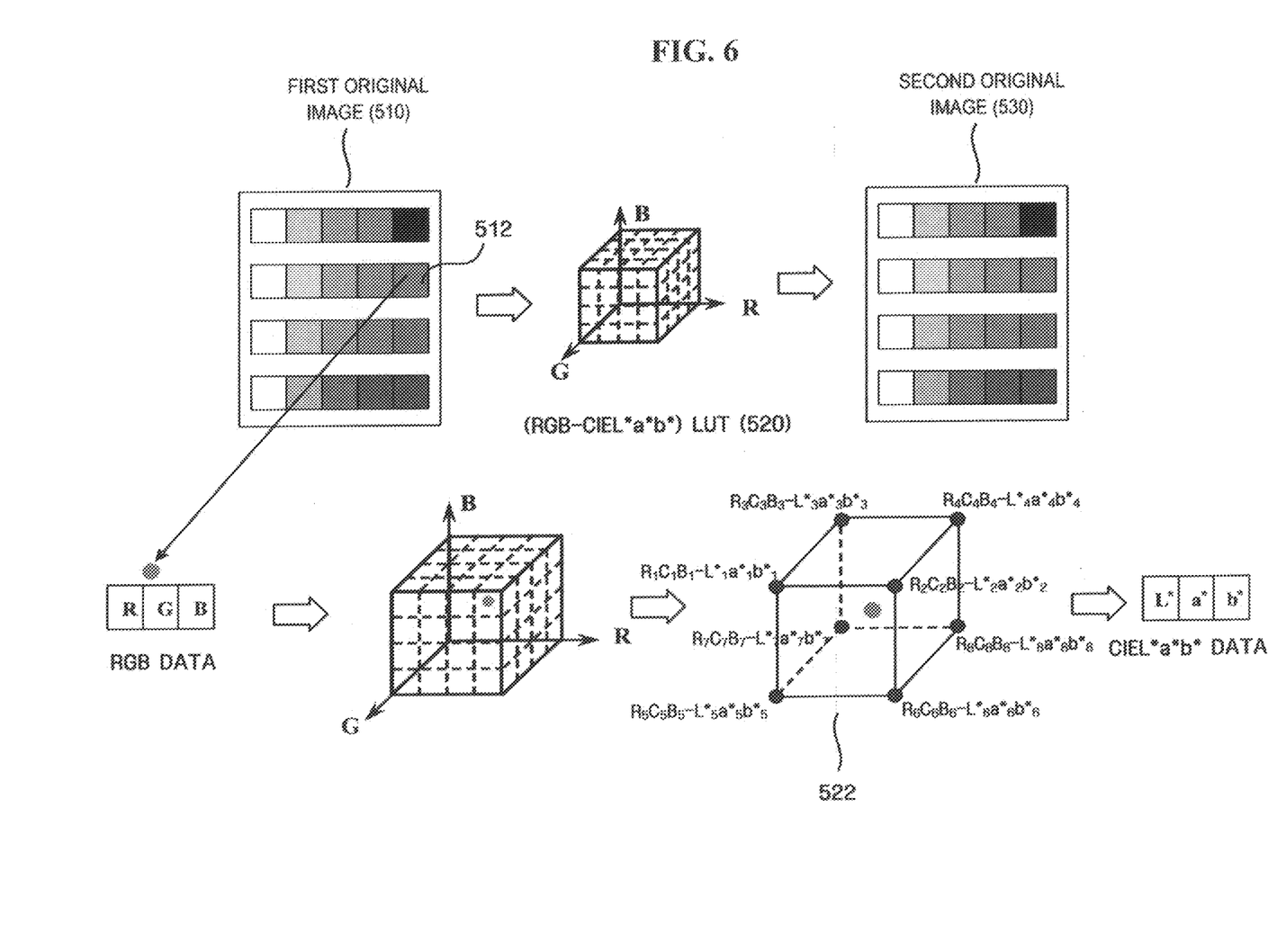
FIG. 6 is a diagram for explaining the conversion of a first original image into a second original image according to an exemplary embodiment of the present invention.

In detail, referring to FIG. 6, a pixel in an arbitrary patch 512 of the first original image 510 comprises RGB data (hereinafter referred to as the input RGB data), which can be mapped into the RGB-to-CIEL*a*b* LUT 520, which is a three-dimensional (3D) LUT established using three axes, i.e., R-, G-, and B-axes. If the input RGB data is mapped to one of a plurality of lattice points of the RGB-to-CIEL*a*b* LUT 520, the input RGB data is converted into CIEL*a*b* data corresponding to the lattice point to which the input RGB data is mapped. However, if the input RGB data is mapped to a point other than the lattice points of the RGB-to-CIEL*a*b* LUT 520, a sub-LUT 522 including the point to which the input RGB data is mapped is extracted from the RGB-to-CIEL*a*b* LUT 520, and the input RGB data is converted into CIEL*a*b* data which is obtained by performing an interpolation method using the input RGB data and eight CIEL*a*b* data respectively corresponding to eight RGB data of the sub-LUT 522. Examples of the interpolation method include a tri-linear interpolation method, a tetrahedral interpolation method, a prism interpolation method, and a pyramid interpolation method. In this manner, all RGB data of the first original image 510 is converted into CIEL*a*b* data, thereby obtaining the second original image 530.

Once the first original image 510 is converted into the second original image 530, the output image estimation module 332 converts the second original image 530 into a first estimated output image 550 using a CIEL*a*b*-to-CMYK LUT 540.

Figure 7:
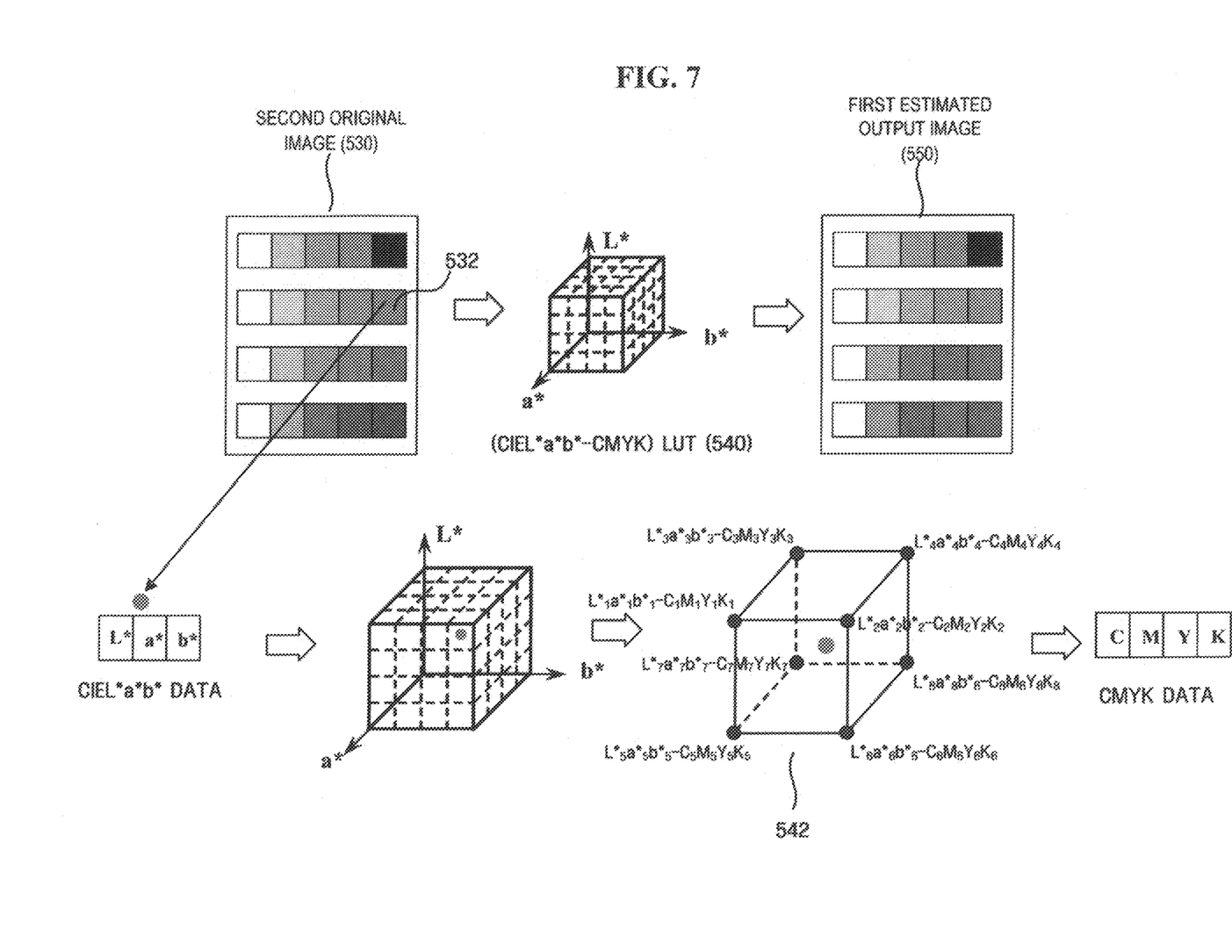
FIG. 7 is a diagram for explaining the conversion of the second original image into a first estimated output image according to an exemplary embodiment of the present invention.

In detail, referring to FIG. 7, a pixel in an arbitrary patch 532 of the second original image 530 comprises CIEL*a*b data (hereinafter referred to as the input CIEL*a*b* data), which can be mapped into the CIEL*a*b*-to-CMYK LUT 540, which is a 3D LUT established using three axes, i.e., L*-, a*-, and b*-axes. If the input CIEL*a*b* data is mapped to one of a plurality of lattice points of the CIEL*a*b*-to-CMYK LUT 540, the input CIEL*a*b* data is converted into CMYK data corresponding to the lattice point to which the input CIEL*a*b* data is mapped. However, if the input CIEL*a*b* data is mapped to a point other than the lattice points of the CIEL*a*b*-to-CMYK LUT 540, a sub-LUT 542 including the point to which the input CIEL*a*b* data is mapped is extracted from the CIEL*a*b*-to-CMYK LUT 540, and the input CIEL*a*b* data is converted into CMYK data which is obtained by performing an interpolation method using the input CIEL*a*b* data and eight CMYK data respectively corresponding to eight CIEL*a*b* data of the sub-LUT 542. Examples of the interpolation method include a tri-linear interpolation method, a tetrahedral interpolation method, a prism interpolation method, and a pyramid interpolation method. In this manner, all CIEL*a*b* data of the second original image 530 is converted into CMYK data, thereby obtaining the first estimated output image 560.

Once the second original image 530 is converted into the first estimated output image 550, the output image estimation module 332 converts the first estimated output image 550 into a second estimated output image 570 using a CMYK-to-CIEL*a*b* LUT 560.

Figure 8A:
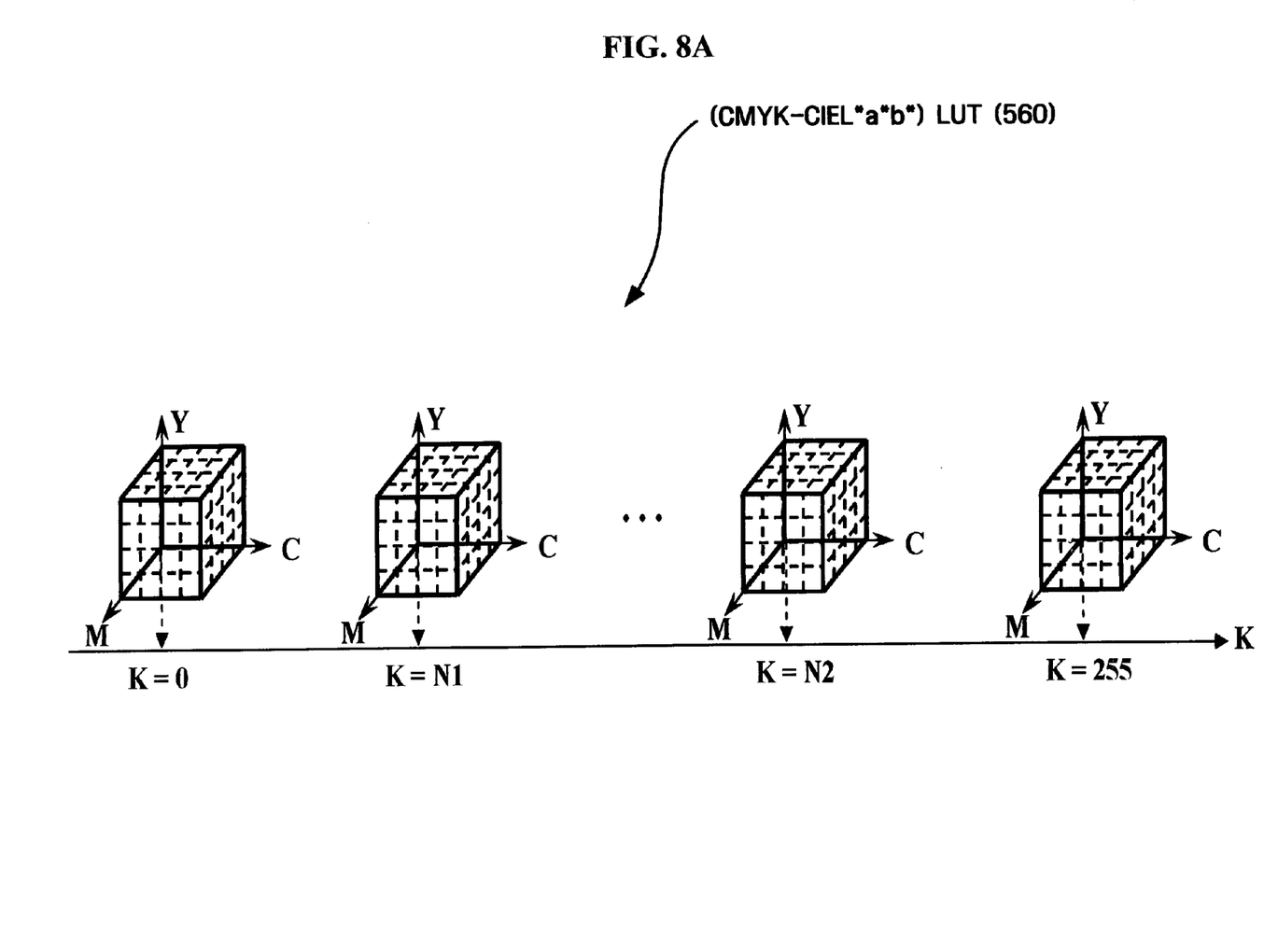
FIGS. 8A and 8B are diagrams for explaining the conversion of the first estimated output image into a second estimated output image according to an exemplary embodiment of the present invention.
Figure 8B:
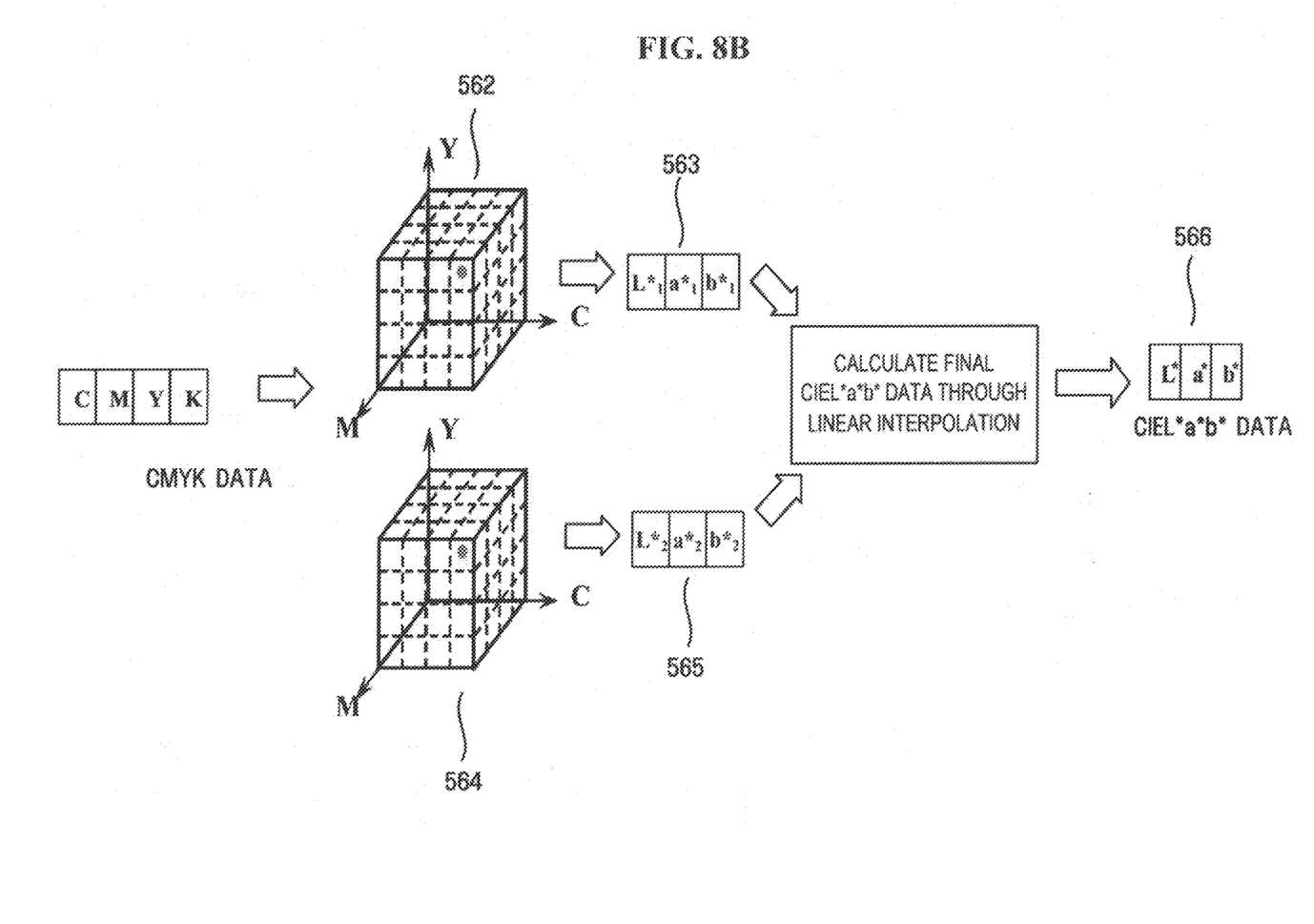

In detail, referring to FIGS. 8A and 8B, a CMYK color space comprises four components, i.e., a cyan component, a magenta component, a yellow component, and a black component, and thus cannot be represented by a single three-dimensional (3D) LUT. Therefore, as illustrated in FIG. 8A, more than one CMYK-to-CIEL*a*b* LUTs must be provided for different K values.

For example, if the K component is represented by 8 bits, the value of the K component is within the range of 0 to 255. If the K component is allowed to have any of the 256 values in the range of 0 to 255, a total of 256 CMYK-to-CIEL*a*b* LUTs are needed. The greater the number of CMYK-to-CIEL*a*b* LUTs provided by the apparatus 300, the more system resources the apparatus 300 needs. Therefore, when system resources are limited, there is the need to allow the K component to be set to only a predefined number of default values chosen from the range of 0 to 255. For example, the K component may be set to one of six default values, i.e., 0, 16, 32, 64, 128, and 256. In this case, a total of six CMYK-to-CIEL*a*b* LUTs are needed.

The output image estimation module 332 chooses two CMYK-to-CIEL*a*b* LUTs respectively corresponding to a pair of adjacent default K values according to the K value of input CMYK data of the first estimated output image 550, wherein the K value of the input CMYK data is between the adjacent default K values. For example, assume that six default K values, i.e., 0, 16, 32, 64, 128, and 256, and six CMYK-to-CIEL*a*b* LUTs respectively corresponding to the six default K values are provided. If the K value of the input CMYK data is 20, the CMYK-to-CIEL*a*b* LUTs respectively corresponding to the default K values of 16 and 32 are chosen.

The input CMYK data can be mapped into a CMYK-to-CIEL*a*b* LUT 562, which is a 3D LUT established using three axes, i.e., M-, C-, and Y-axes, and corresponds to the default K value of 16. If the input CMYK data is mapped to one of a plurality of lattice points of the CMYK-to-CIEL*a*b* LUT 562, the input CMYK data is converted into CIEL*a*b* data corresponding to the lattice point to which the input CMYK data is mapped. However, if the input CMYK data is mapped to a point other than the lattice points of the CMYK-to-CIEL*a*b* LUT 562, a sub-LUT including the point to which the input CMYK data is mapped is extracted from the CMYK-to-CIEL*a*b* LUT 562, and first CIEL*a*b* data 563 is obtained by performing an interpolation method using the input CMYK data and eight CIEL*a*b* data respectively corresponding to eight CMYK data of the extracted sub-LUT. Examples of the interpolation method include a tri-linear interpolation method, a tetrahedral interpolation method, a prism interpolation method, and a pyramid interpolation method.

Likewise, the input CMYK data can be mapped into a CMYK-to-CIEL*a*b* LUT 564, which is a 3D LUT established using three axes, i.e., the M-, C-, and Y-axes, and corresponds to the default K value of 32. In this manner, second CIEL*a*b* data 565 is obtained.

Thereafter, the output image estimation module 332 performs linear interpolation using the first and second CIEL*a*b* data 563 and 565 and the K value of the input CMYK data, thereby obtaining final CIEL*a*b* data 566. The final CIEL*a*b* data 566 can be obtained using the distance between the K value of the input CMYK data and the default K value of 16 and the distance between the K value of the input CMYK data and the default K value of 32, as indicated by Equation (1):

$$L^*a^*b^* = \frac{32-20}{32-16}L_1^*a_1^*b_1^* + \frac{20-16}{32-16}L_2^*a_2^*b_2^* \quad (1)$$

where $L^*_1 a^*_1 b^*_1$ represents the first CIEL*a*b* data 563, and $L^*_2 a^*_2 b^*_2$ represents the second CIEL*a*b* data 565.

In this manner, all CMYK data of the first estimated output image 550 is converted into CIEL*a*b*, thereby obtaining the second estimated output image 570.

Once the first original image 510 is converted into the second estimated output image 570 by the output image estimation module 332, the error detection module 336 compares the second original image 530 with the second estimated output image 570, and detects an error between the second original image 530 and the second estimated output image 570 by searching for one or more patches where the lightness-chroma-hue relationship of the second original image 530 does not match the lightness-chroma-hue relationship of the second estimated output image 570. This will hereinafter be described in further detail with reference to FIG. 9.

Figure 9:
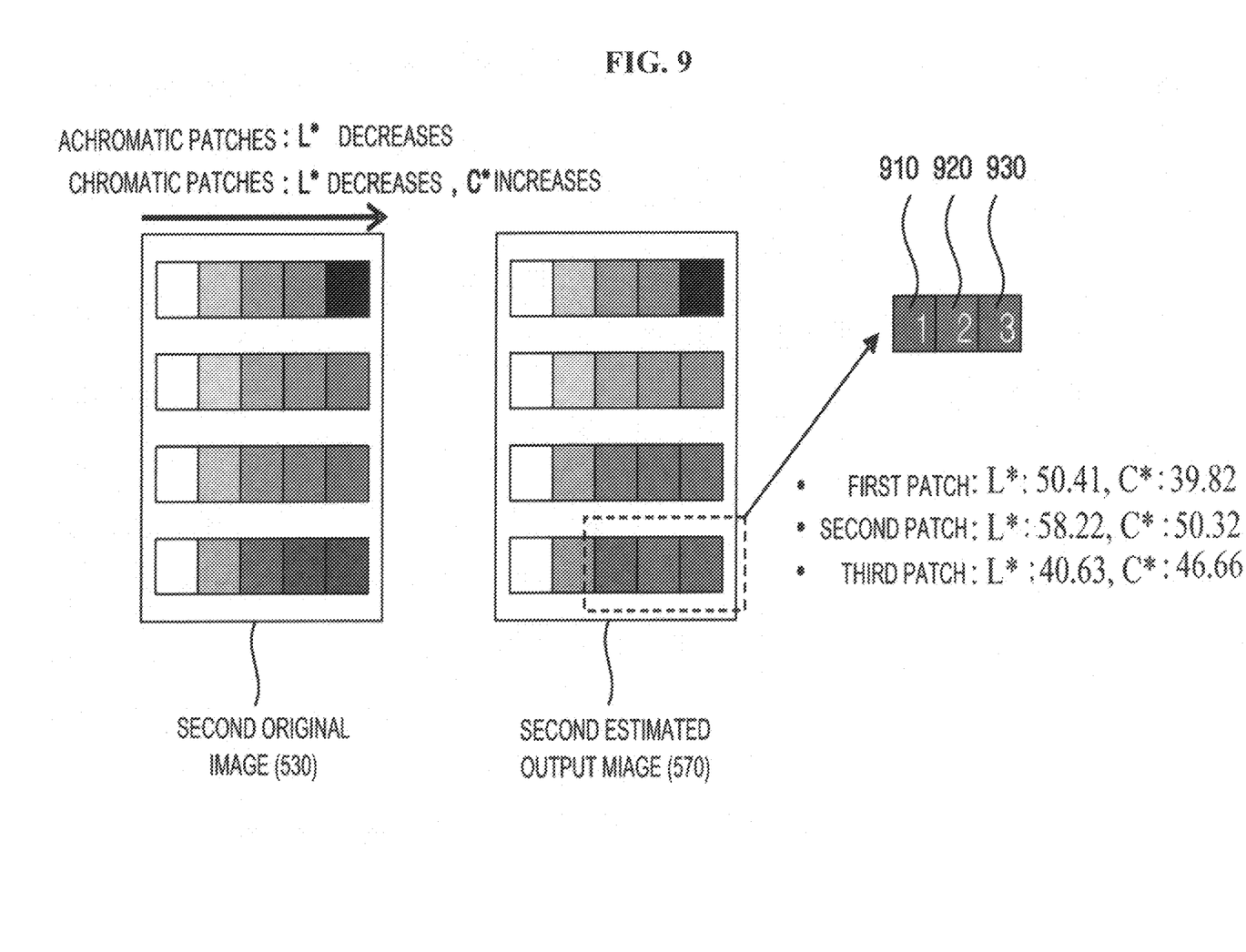
FIG. 9 is a diagram for explaining the detecting of errors by an error detection module (illustrated in FIG. 4) according to an exemplary embodiment of the present invention.

Referring to FIG. 9, a L* component for achromatic color patches of the second original image 530 increases along a predetermined direction which is marked by an arrow, an L* component for chromatic color patches of the second original image 530 decreases along the predetermined direction, and a C* component C*(Chroma) for the chromatic color patches of the second original image 530 increases along the predetermined direction. The C* component C*(Chroma) can be defined using an a* component and a b* component of CIEL*a*b* data, as indicated by Equation (2):

$$C^*(\text{Chroma}) = \sqrt{a^{*2} + b^{*2}} \quad (2).$$

Referring to FIG. 9, the L* values and C* values of a first patch 910, a second patch 920, and a third patch 930 of the second estimated output image 570 provided by the output image estimation module 332 are examined. The results of the examination indicate that an error has occurred in the second patch 920.

In detail, the L* value of the second estimated output image 570 is supposed to gradually decrease in such a manner that the L* value of the first patch 910 is higher than the L* value of the second patch 920 and that the L* value of the second patch 920 is higher than the third patch 930. However, the L* value of the second estimated output image 570 varies in such a manner that the L* value of the second patch 920 is higher than the L* value of the first patch 910 and the L* value of the third patch 930. In addition, the C* value of the second estimated output image 570 is supposed to gradually increase in such a manner that the L* value of the first patch 910 is lower than the L* value of the second patch 920 and that the L* value of the second patch 920 is lower than the third patch 930. However, the C* value of the second estimated output image 570 varies in such a manner that the C* value of the second patch 920 is higher than the C* value of the first patch 910 and the C* value of the third patch 930. Due to the L* and C* values of the second patch 920, the lightness-chroma-hue relationship of the second original image 530 does not match the lightness-chroma-hue relationship of the second estimated output image 570.

If no error patch is detected from the second estimated output image 570, the error detection module 336 transmits the first estimated output image 550 or the second estimated output image 570 to the external device interface module 350.

On the other hand, if an erroneous patch is detected from the second estimated output image 570, the LUT compensation module 338 compensates the CIEL*a*b*-to-CMYK LUT 540 using the detected patch.

Figure 10:
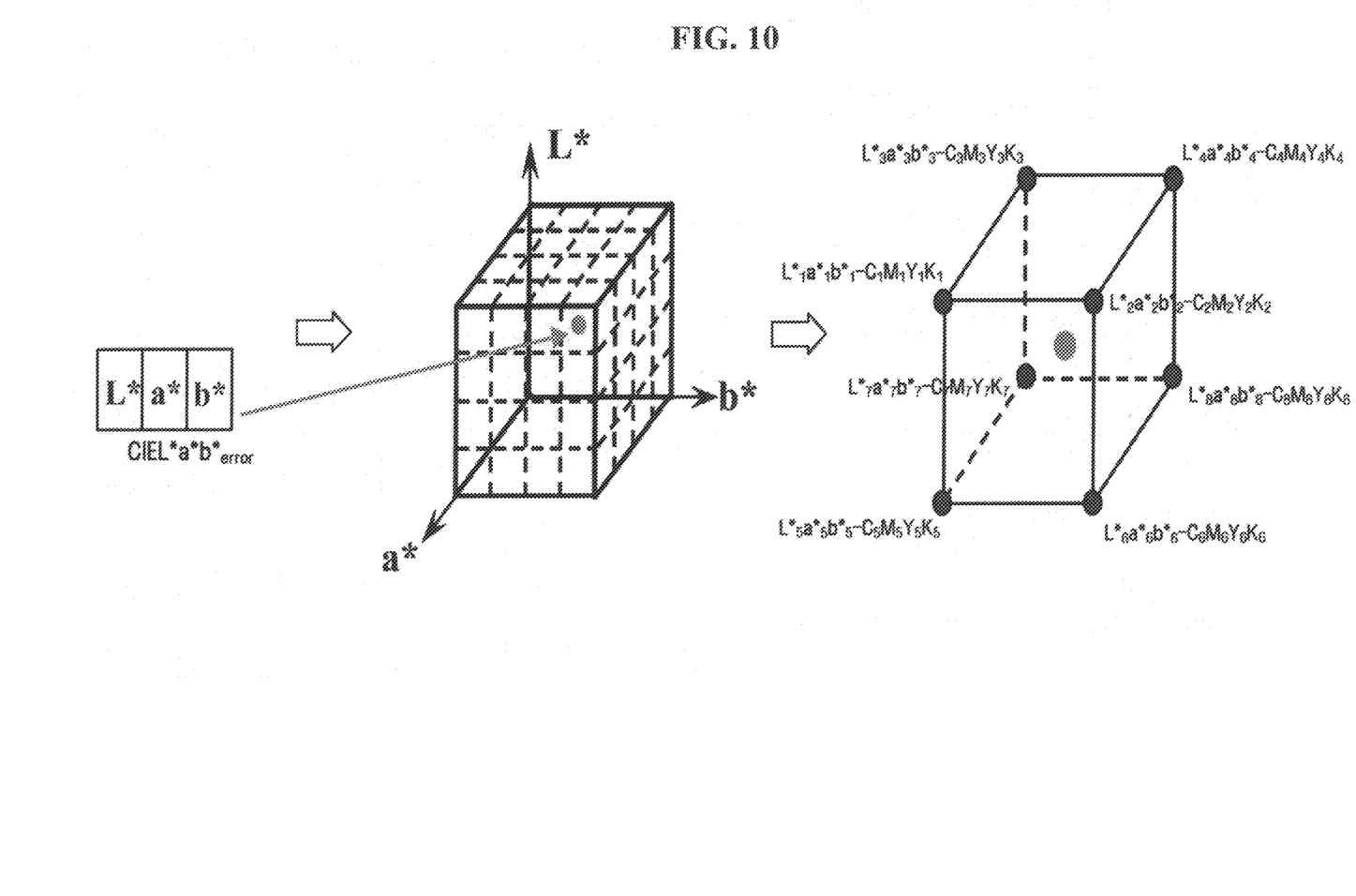
FIG. 10 is a diagram for explaining a lookup table (LUT) compensation operation performed by an LUT compensation module (illustrated in FIG. 4) to compensate an L*a*b*-to-CMYK LUT LUT according to an exemplary embodiment of the present invention.

For this, assume that the CMYK value of an erroneous patch detected from the second estimated output image 570 is $CMYK_{old}$ and needs to be replaced with $CMYK_{new}$ and that the CIEL*a*b* value of an arbitrary pixel in the erroneous patch detected from the second estimated output image 570 is $CIEL^*a^*b^*_{error}$.

The error detection module 336 chooses a total of eight CIEL*a*b* data, including $CIEL^*a^*b^*_{error}$, from the CIEL*a*b*-to-CMYK LUT 540. The chosen eight CIEL*a*b* data and eight CMYK data (i.e., first through eighth CMYK data $C_1M_1Y_1K_1$ through $C_8M_8Y_8K_8$) respectively corresponding to the chosen eight CIEL*a*b* data are illustrated in FIG. 10.

The error detection module 336 compensates the first through eighth CMYK data $C_1M_1Y_1K_1$ through $C_8M_8Y_8K_8$ using $CMYK_{old}$ and $CMYK_{new}$, as indicated by Equation (3):

$$C'_1 = C_1 \times C\_Ratio, \quad M'_1 = M_1 \times M\_Ratio, \quad (3)$$
$$Y'_1 = Y_1 \times Y\_Ratio, \quad K'_1 = K_1 \times K\_Ratio,$$
$$\ldots$$
$$C'_8 = C_8 \times C\_Ratio, \quad M'_8 = M_8 \times M\_Ratio,$$
$$Y'_8 = Y_8 \times Y\_Ratio, \quad K'_1 = K_8 \times K\_Ratio$$

where $$C\_Ratio = \frac{C_{new}}{C_{old}}, \quad M\_Ratio = \frac{M_{new}}{M_{old}}, \quad Y\_Ratio = \frac{Y_{new}}{Y_{old}}, \text{ and}$$
$$K\_Ratio = \frac{K_{new}}{K_{old}}.$$

In this manner, the CIEL*a*b*-to-CMYK LUT 540 is compensated. Then, the output image estimation module 332 re-estimates an output image for an original image using the compensated CIEL*a*b*-to-CMYK LUT 540.

The output image estimation module 332 converts the second original image 530 into the first estimated output image 550 using the compensated CIEL*a*b*-to-CMYK LUT 540, thereby preventing any error from being generated between the second original image 530 and the first estimated output image 550.

Figure 11:
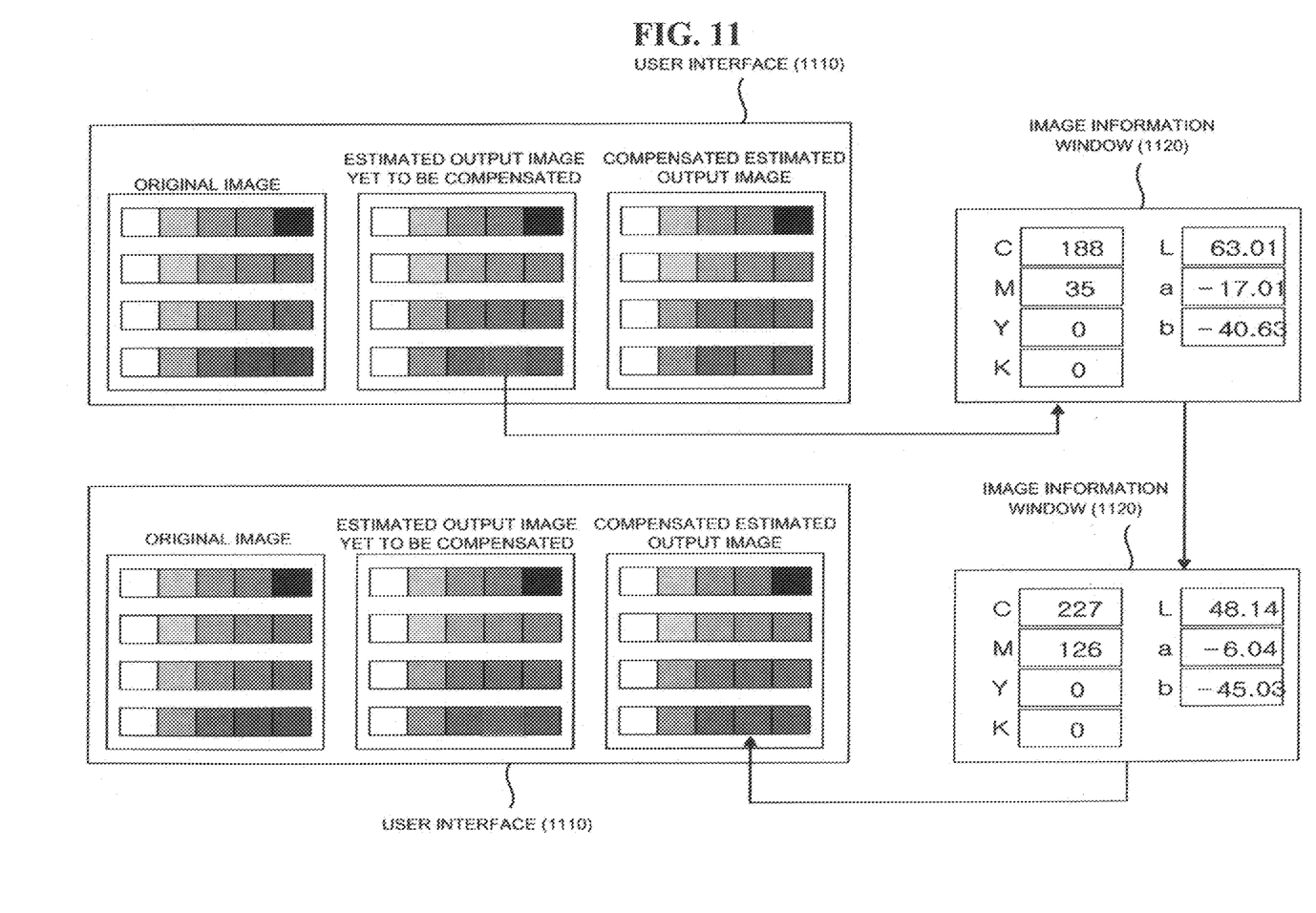
FIG. 11 is a diagram for explaining the compensating of an output image by a user using a user interface according to an exemplary embodiment to the present invention.

FIG. 11 is a diagram for explaining the compensating of an output image by a user using a user interface 1110 according to an exemplary embodiment of the present invention. Referring to FIG. 11, the user interface 1110 may be provided to the user by the user interface module 310.

The apparatus 300 provides an original image, an estimated output image yet to be compensated, and an estimated output image compensated by the output image estimation module 332 to the user via the user interface 1110. Since a CIEL*a*b*-to-CMYK LUT has not yet been compensated, the estimated output image yet to be compensated and the compensated estimated output image appear the same on the user interface 1110.

If the user examines a plurality of patches of the estimated output image yet to be compensated and chooses one of the patches that is deemed erroneous, an image information window 1120 in which the CMYK and L*a*b* value of the chosen patch is displayed pops up.

If the user corrects image information of the chosen patch to have a desired CMYK value or a desired L*a*b* value, the CIEL*a*b*-to-CMYK LUT is compensated according to the corrected image information, and an output image may be re-estimated for the original image using the compensated CIEL*a*b*-to-CMYK LUT. Thereafter, the re-estimated output image is displayed to the user by the user interface 1110.

Figure 12:
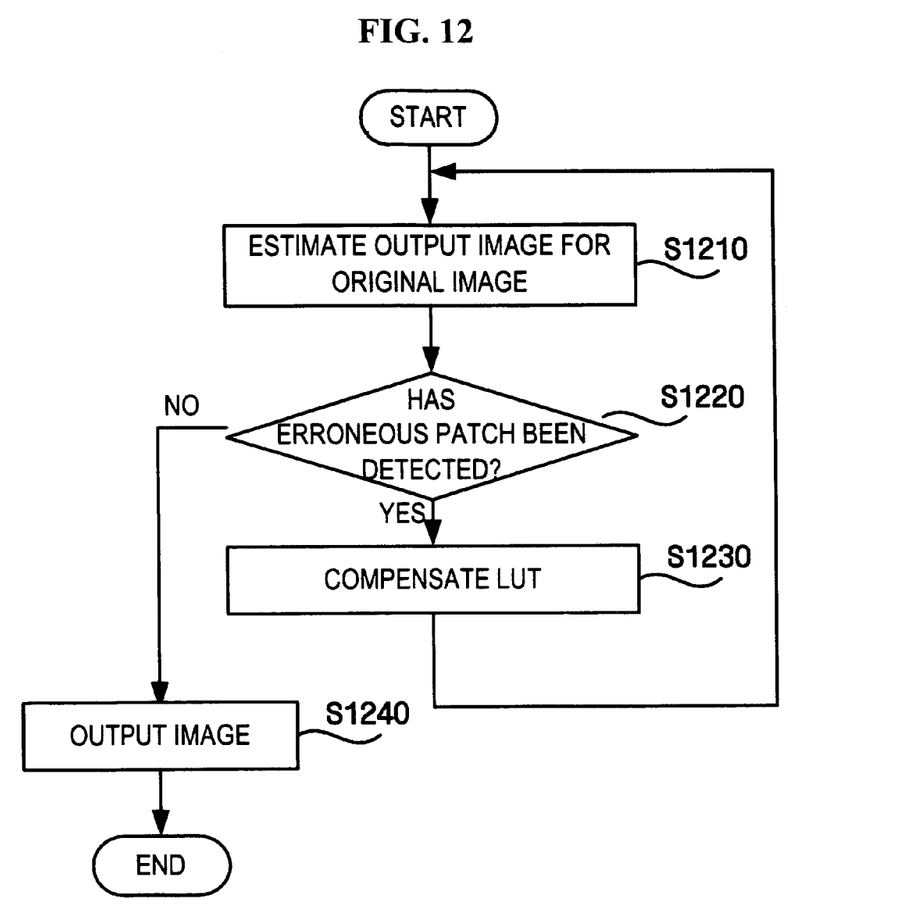
FIG. 12 is a flowchart illustrating a method of compensating an output image according to an exemplary embodiment of the present invention.

FIG. 12 is a flowchart illustrating a method of compensating an output image according to an exemplary embodiment of the present invention. Referring to FIG. 12, in operation S1210, an output image is estimated for an original image using a predetermined LUT for color space conversion. Here, the predetermined LUT may be an LUT comprising mapping information between a standard color space and a color space adopted by an external output device.

In operation S1220, image information of the original image corresponding to the standard color space is compared with image information of the estimated output image corresponding to the standard color space, and it is determined whether the estimated output image comprises erroneous patches. In operation S1240, if no erroneous patches are detected from the estimated output image in operation S1220, the estimated output image is output using the image information of the estimated output image corresponding to the standard color space or image information of the estimated output image corresponding to the color space adopted by the external output device.

In operation S1230, if one or more erroneous patches are detected from the estimated output image in operation S1220, the predetermined LUT is compensated using the aforementioned LUT compensation method, and the method returns to operation S 1210 so that an output image is re-estimated for the original image using the compensated LUT.

As described above, according to the present invention, it is possible for a user to freely edit a predetermined color of an LUT which is designed in advance for correcting colors of a color printer.

In addition, according to the present invention, it is possible to generate and output an output image estimated for an original image having a predefined lightness-chroma-hue relationship while keeping the predefined lightness-chroma-hue relationship intact.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for compensating an output image, comprising:
    a processor;
    an output image estimation module, executed on the processor, which estimates an output image based on an original image and three lookup tables (LUTs) that map one color space to another color space;
    an error detection module which detects an erroneous patch from the estimated output image; and
    an LUT compensation module which compensates at least one LUT of the three LUTs based on the detected patch,
    wherein the original image comprises color data having a predetermined lightness-chroma-hue relationship, and
    wherein the LUT compensation module compensates the at least one LUT using a ratio of a data value of the detected patch and a desired data value with which the data value of the detected patch is to be replaced.

2. The apparatus of claim 1, wherein the output image estimation module estimates an output image for the original image using the compensated at least one LUT.

3. The apparatus of claim 1, wherein the at least one of the three LUTs maps a color space of the original image to a standard color space and the other LUTs map the standard color space to a color space of an external output device.

4. The apparatus of claim 3, wherein the color space of the original image comprises an RGB color space, the standard color space comprises a CIEL*a*b* color space, and the color space of the external output device comprises a CMYK color space.

5. A method of compensating an output image, comprising:
    (a) estimating, using a processor, an output image based on an original image and three lookup tables (LUTs) that map one color space to another color space;
    (b) detecting an erroneous patch from the estimated output image; and
    (c) compensating at least one LUT of the three LUTs based on the detected patch,
    wherein the original image comprises color data having a predetermined lightness-chroma-hue relationship, and
    wherein (c) further comprises compensating the at least one LUT using the ratio of a data value of the detected patch and a desired data value with which the data value of the detected patch is to be replaced.

6. The method of claim 5 further comprising (d) estimating an output image for the original image using the at least one compensated LUT.

7. The method of claim 5, wherein the at least one of the three LUTs maps a color space of the original image to a standard color space and the other LUTs map the standard color space to a color space of an external output device.

8. The method of claim 7, wherein the color space of the original image comprises an RGB color space, the standard color space comprises a CIEL*a*b* color space, and the color space of the external output device comprises a CMYK color space.

9. A method of compensating an output image in an apparatus for compensating the output image, the method comprising:
    converting, using a processor and a first lookup table (LUT), a first original image in a first color space to a second original image in a second color space, the first LUT being an RGB-to-CIEL*a*b* LUT;
    estimating, using a second lookup table (LUT), a first estimated output image in a third color space based on the second original image in the second color space, the second LUT being a CIEL*a*b*-to-CMYK LUT;
    estimating, using a third lookup table (LUT), a second estimated output image in the second color space based on the first estimated output image in the third color space, the third LUT being a CMYK-to-CIEL*a*b* LUT;

detecting an erroneous patch by comparing at least a portion of the second original image with a corresponding portion of the second estimated output image; and compensating, in response to the detecting the erroneous patch, the second LUT based on the erroneous patch, wherein the original image comprises color data having a predetermined lightness-chroma-hue relationship, and wherein the compensating comprises compensating the second LUT using the ratio of a data value of the detected patch and a desired data value with witch the data value of the detected patch is to be replaced.

* * * * *